United States Patent
Tso et al.

(10) Patent No.: US 6,681,298 B1
(45) Date of Patent: Jan. 20, 2004

(54) HYPERTEXT MARKUP LANGUAGE CACHE SYSTEM AND METHOD

(75) Inventors: Victor Tso, Palo Alto, CA (US); Brian Knittel, Palo Alto, CA (US)

(73) Assignee: PowerTV, Inc., Lawrenceville, GA (US)

(*) Notice: Subject to any disclaimer, the term of this patent is extended or adjusted under 35 U.S.C. 154(b) by 438 days.

(21) Appl. No.: 09/614,239

(22) Filed: Jul. 12, 2000

(51) Int. Cl.$^7$ .............................................. G06F 12/00
(52) U.S. Cl. .................... 711/133; 711/134; 711/136
(58) Field of Search ................. 711/133, 134, 711/136; 709/245; 725/46, 110

(56) References Cited

U.S. PATENT DOCUMENTS

| | | | | | |
|---|---|---|---|---|---|
| 5,572,643 | A | * | 11/1996 | Judson | 709/218 |
| 6,025,837 | A | * | 2/2000 | Matthews et al. | 345/721 |
| 6,049,821 | A | * | 4/2000 | Theriault et al. | 709/203 |
| 6,226,642 | B1 | * | 5/2001 | Beranek et al. | 707/10 |
| 6,249,844 | B1 | * | 6/2001 | Schloss et al. | 711/122 |
| 6,317,791 | B1 | * | 11/2001 | Cohn et al. | 709/227 |
| 6,345,292 | B1 | * | 2/2002 | Daugherty et al. | 709/214 |
| 6,360,275 | B1 | * | 3/2002 | Chu et al. | 709/245 |
| 6,374,404 | B1 | * | 4/2002 | Brotz et al. | 725/46 |
| 6,381,748 | B1 | * | 4/2002 | Lin et al. | 725/109 |
| 6,421,683 | B1 | * | 7/2002 | Lamburt | 707/104.1 |

OTHER PUBLICATIONS

Iran, "Page Replacement with Multi–Size Pages and Applications to Web Caching," pp 701–710, ACM, 1997.*
Wang, "A Survey of Web Caching Schemes for the Internet," pp 36–46, ACM, Oct. 1999.*
Dilley et al., "Improving Proxy Cache: Analysis of Three Replacement Policies," pp 44–50, IEEE, Dec. 1999.*
Hosseini–Khayat, "Replacement Algorithms for Object Caching," pp 90–97, ACM, Jun., 1998.*
Reddy, "Evaluation of Caching Strategies for an Internet Server," pp 118–125, IEEE, Apr., 1997.*
Reddy, "Effectiveness of Caching Policies for a Web Server," pp 94–99, IEEE, Dec. 1997.*

* cited by examiner

*Primary Examiner*—Matthew Kim
*Assistant Examiner*—Stephen Elmore
(74) *Attorney, Agent, or Firm*—Kenneth M. Massaroni; Hubert J. Barnhardt, III; Shelley L. Couturier

(57) ABSTRACT

The present invention is directed towards a cache management system for a set top box that improves the loading speed of hypertext markup language (HTML) documents that are provided by web servers. The cache management system includes a set top box with a processor and memory that includes cache, where a plurality of HTML documents is stored in the cache. A cache manager manages the cache and calculates a removal factor for each of the HTML documents. The cache manager removes at least one of the HTML documents based on its removal factor until sufficient room is available for an additional HTML document. Additionally, the cache manager keeps the maximum number of relevant web pages in cache to maximize loading speed.

32 Claims, 8 Drawing Sheets

| Key | LastUsed | TimesUsed | Size | Type | C/D | Priority | Removal Factor |
|---|---|---|---|---|---|---|---|
| www.add... | 12/5/00 10:05 | 4 | 100 | A | D | 8 | 80 |
| www.dfd... | 12/4/00 8:00 | 1 | 5 | T | D | 4 | 65 |
| www.zed... | 11/5/00 18:59 | 5 | 4500 | V | C | 0 | 52 |
| www.edd... | 12/4/00 9:58 | 1 | 15 | T | D | 0 | 10 |
| ... | ... | ... | ... | ... | ... | ... | ... |

400

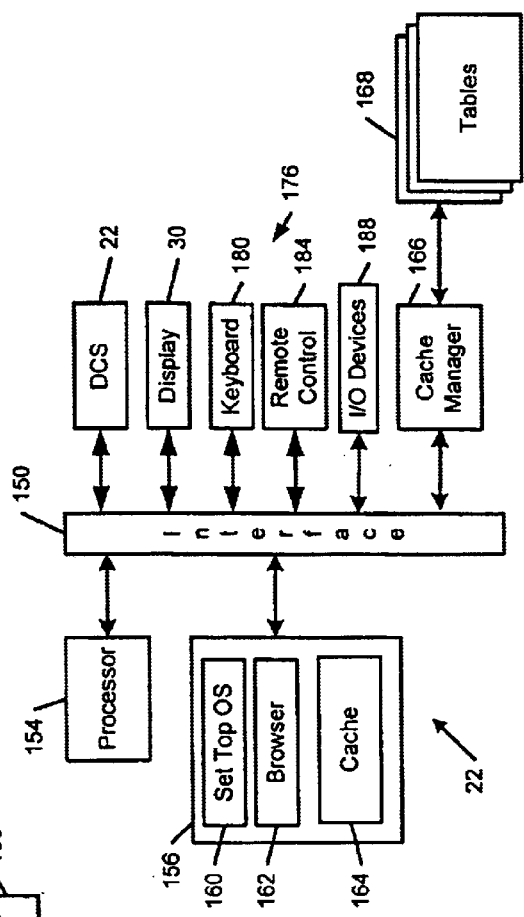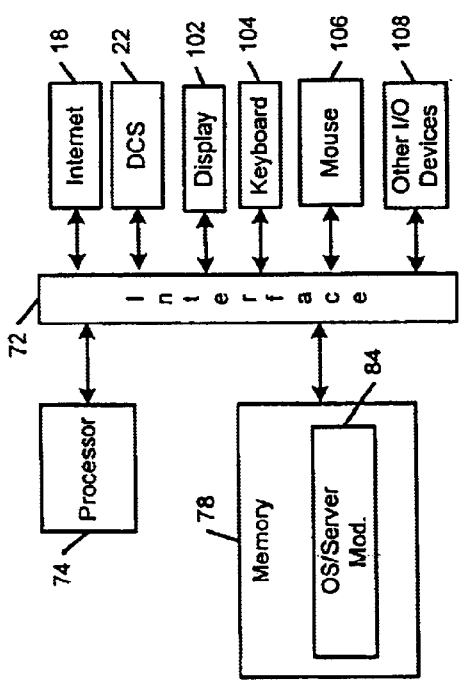

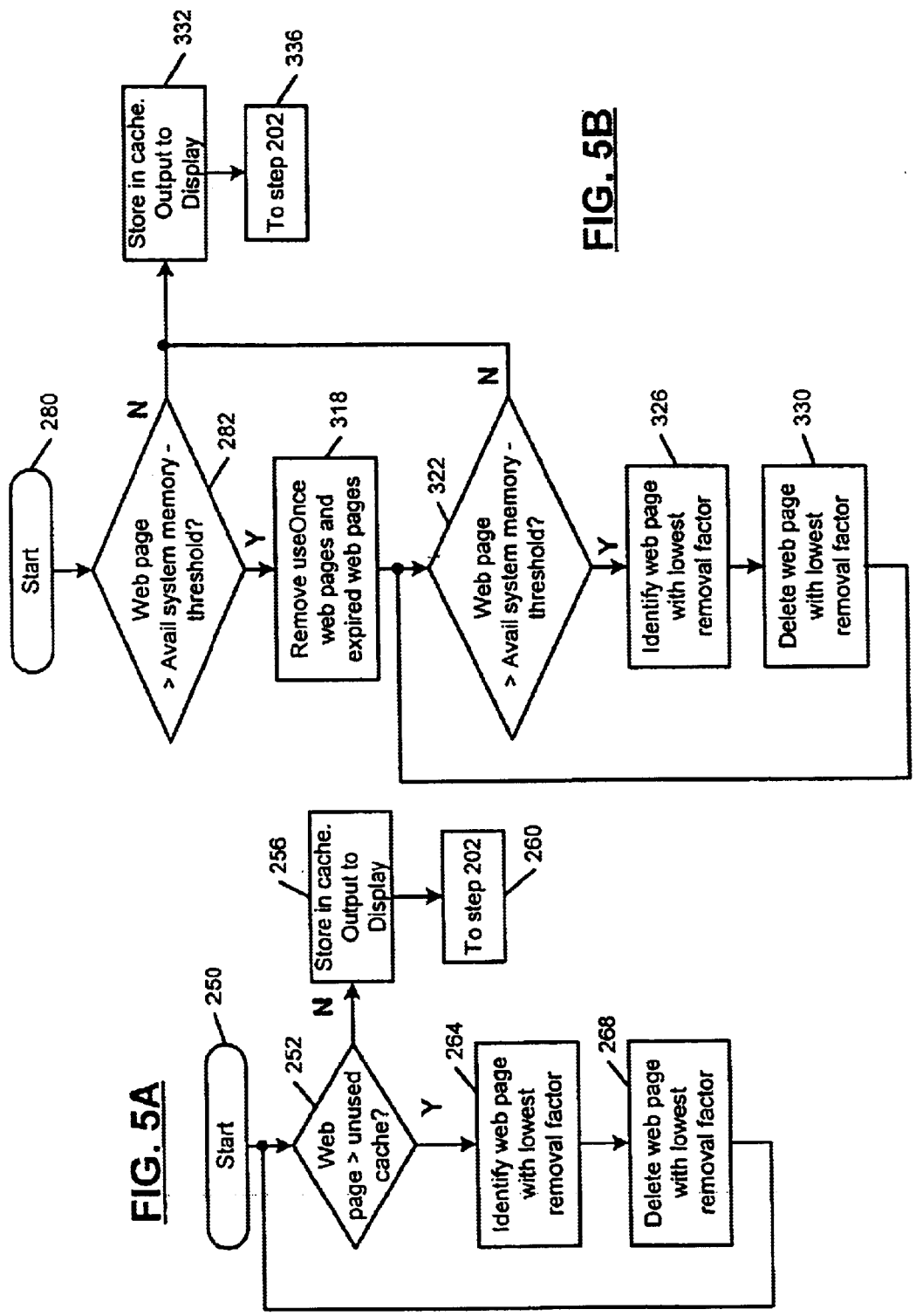

FIG. 7A

| Key | LastUsed | TimesUsed | Size | Type | C/D | Priority | Removal Factor |
|---|---|---|---|---|---|---|---|
| www.add... | 12/5/00 10:05 | 4 | 100 | A | D | 8 | 80 |
| www.dfd... | 12/4/00 8:00 | 1 | 5 | T | D | 4 | 65 |
| www.zed... | 11/5/00 18:59 | 5 | 4500 | V | C | 0 | 52 |
| www.edd... | 12/4/00 9:58 | 1 | 15 | T | D | 0 | 10 |
| ... | | | | | | | |

| Type | FW1 | FW2 | FW3 | FW4 | FW5 | FW6 |
|---|---|---|---|---|---|---|
| A | 30 | 0 | 0 | 20 | 30 | 10 |
| V | 50 | 20 | 10 | 15 | 0 | 10 |
| T | 15 | 15 | 15 | 15 | 20 | 20 |
| ... | | | | | | |

| Type | Value |
|---|---|
| A | 20 |
| V | 40 |
| T | 60 |
| ... | |

| C/D | Value |
|---|---|
| C | 90 |
| D | 40 |
| ... | |

| TimesUsed | Value |
|---|---|
| 1 | 20 |
| 2 | 30 |
| 3 | 50 |
| 4 | 70 |
| 5 | 90 |
| ... | |

462

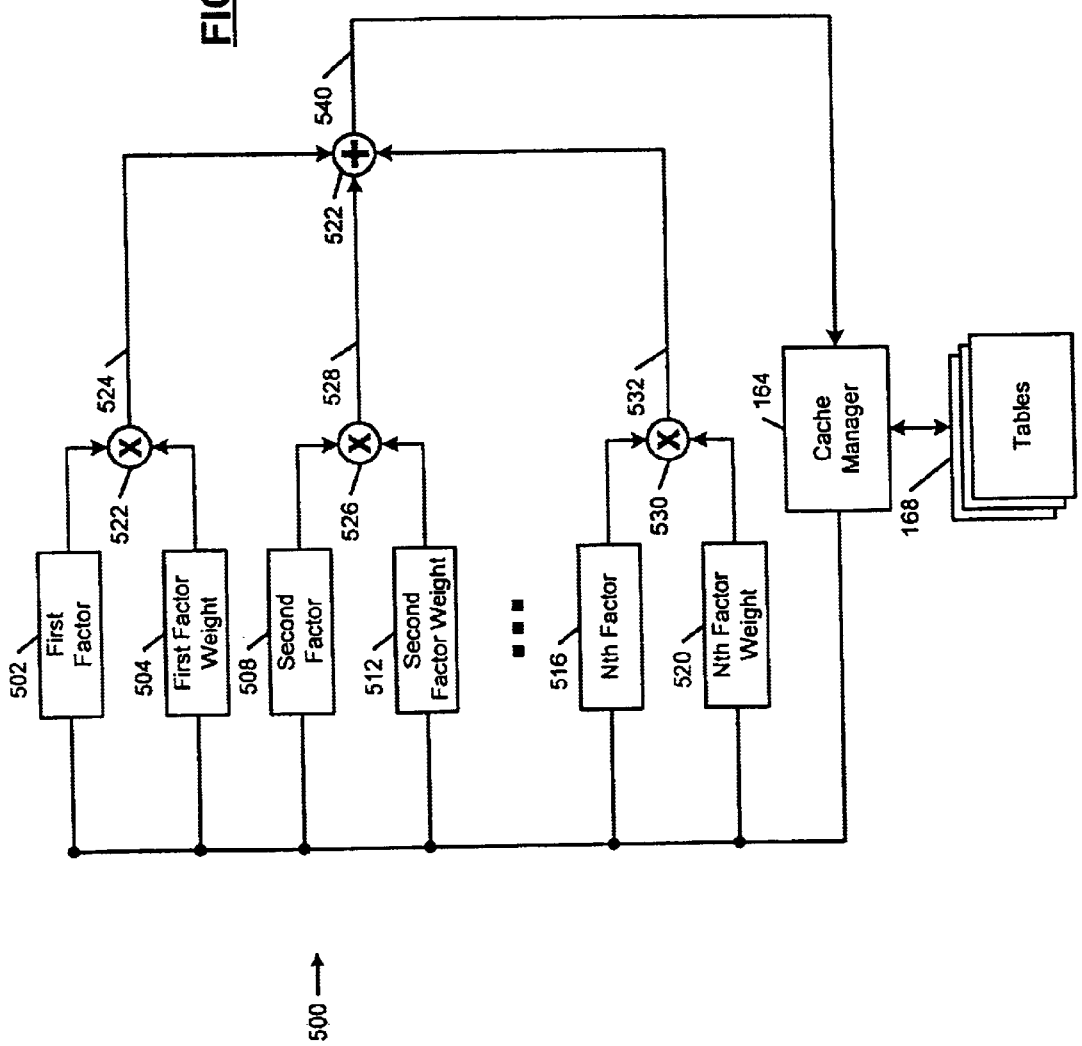

HYPERTEXT MARKUP LANGUAGE CACHE SYSTEM AND METHOD

TECHNICAL FIELD

This invention relates to cache systems. More particularly, this invention relates to the use of cache systems in a set top box environment for accessing hypertext markup language (HTML) documents.

BACKGROUND OF THE INVENTION

Set top boxes typically provide an interface between a television display or peripheral and a multimedia source that includes audio and video content. In some instances, the set top box is integrated with the television. The set top boxes are connected by cable systems (coaxial, fiberoptic, etc.), satellite-based systems, and other terrestrial-based systems to one or more media providers. The multimedia sources predominantly provide video that contains moving images. In the future, set top boxes will also be required to interface with distributed communications systems such as the Internet.

When a user accesses the Internet, the user typically employs a web browser that issues hypertext transfer protocol (HTTP) requests using Transmission Control Protocol/Internet Protocol (TCP/IP) to a host server. The host server runs software that responds to the HTTP requests. When the user requests a web page, the host server retrieves the web page and sends it to the user over the Internet. Web pages or HTML documents are made up of HTML text plus images, audio, video, scripts, fonts, and other media types.

The current web page access times that are required to retrieve a requested web page are commercially unacceptable. Web users do not like to wait very long to load web pages into their browsers. As loading speed increases, the users tend to lose interest. Loading speed continues to be the number one problem of web browsers.

SUMMARY OF THE INVENTION

A cache management system for a set top box improves the loading speed of hypertext markup language (HTML) documents that are provided by web servers through a distributed communications system. The cache management system includes a set top box with a processor and memory that includes cache. HTML documents are stored in the cache. A cache manager manages the cache and calculates a removal factor for each of the HTML documents. The cache manager removes the HTML documents based on its removal factor until sufficient room is available for an additional HTML document when a user requests access to the additional HTML document and insufficient cache is available to store the additional HTML document. The cache manager keeps as many relevant documents as possible in the cache.

In other features of the invention, the removal factor is at least partially based on usage of the HTML documents such as a number of times that the HTML documents was used and how long since the HTML documents were last used.

In still other features of the invention, the removal factor is at least partially based on a size of the HTML documents, a file type of the HTML documents, whether the HTML documents are compressed or decompressed, and/or a developer-designated priority for the HTML documents.

In yet other features of the invention, the removal factor is calculated by multiplying a first factor by a first weight to generate a first product, a second factor by a second weight to generate a second product, and an $n^{th}$ factor by an $n^{th}$ weight to generate an $n^{th}$ product. The first, second and nth products are summed. The first, second and $n^{th}$ products can be normalized prior or after being summed.

In other features of the invention, a table is accessible by the cache manager and is stored in memory of the set top box. The HTML documents are arranged in an ordered list based on the removal factors.

In still other features of the invention, the cache manager employs hysteresis when removing the HTML documents from the cache to create room for the additional HTML document when the user requests access to the additional HTML document and insufficient cache is available to store the additional HTML document. The cache manager provides hysteresis by continuing to remove the HTML documents until a predetermined breathing room threshold is available.

Still other objects, features, and advantages will be readily apparent from the specification, the drawings, and the claims.

DESCRIPTION OF THE DRAWINGS

FIG. 2 is a function block diagram of a web server;

FIG. 3 is a functional block diagram of a set top box;

FIG. 5A is a flowchart illustrating steps for removing cache items from the cache when a new web page has been requested;

FIG. 5B illustrates the flowchart of FIG. 5A with additional steps for removing "useOnce" web pages and expired web pages and for maintaining cache and system comfort levels;

FIG. 7A illustrates a table for managing cache items;

FIG. 7B illustrates a table for storing factor weights according to cache item type;

FIG. 7C illustrates a table that contains values that are substituted for the "Type" column values when calculating the removal factors;

FIG. 7D illustrates a table that contains values that are substituted for the "C/D" column values when calculating the removal factors;

FIG. 7E illustrates a table contains values that are substituted for the "TimesUsed" column values when calculating the removal factors;

FIG. 9 is a data flow view illustrating a preferred way of calculating the removal factors.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing preferred exemplary embodiments of the invention. It being understood that various changes may be made in the function and arrangement of the elements without departing from the spirit and scope of the invention as set forth in the appended claims.

Figure 1:
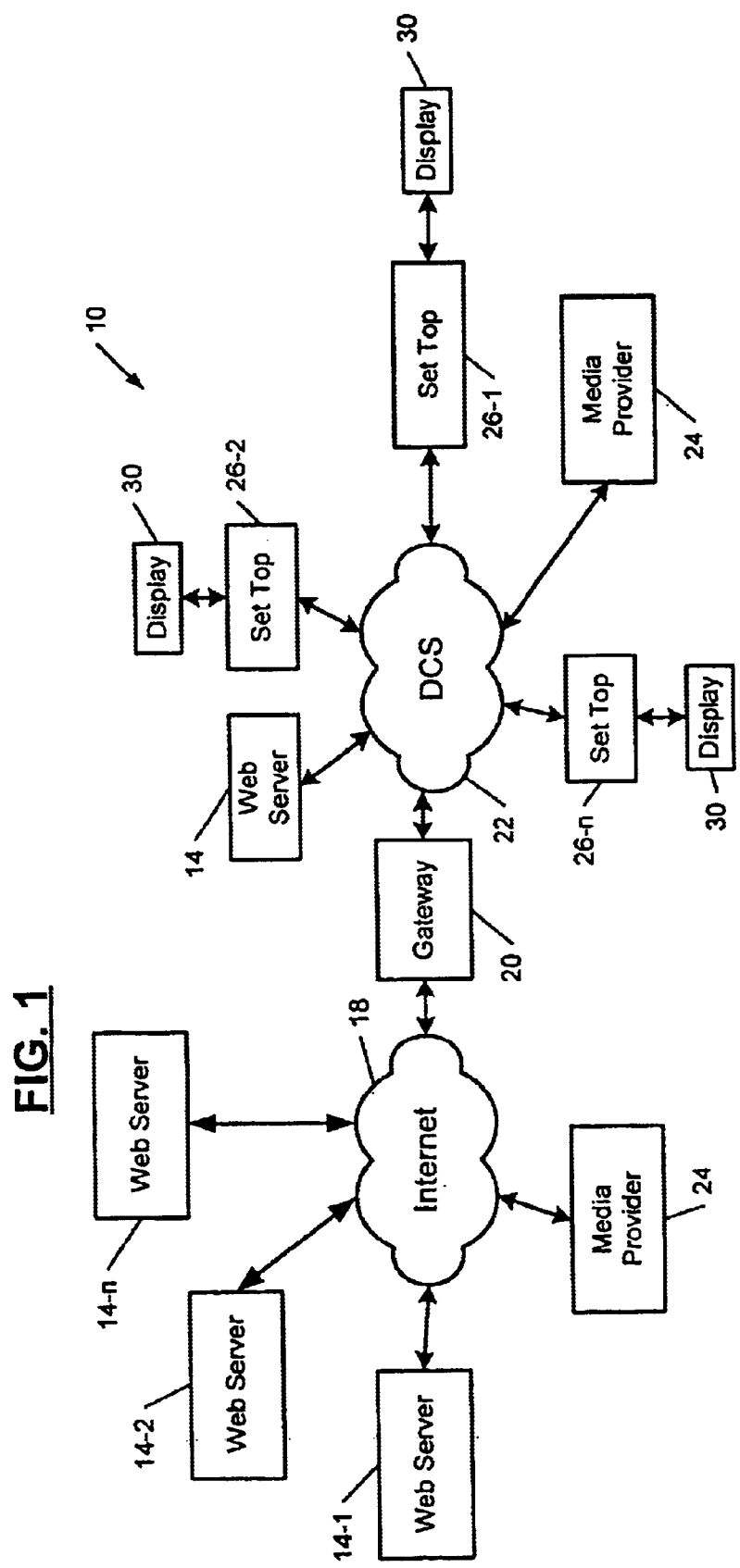
FIG. 1 is a functional block diagram of a set top box system according to the invention.

Referring to FIGS. 1 and 2, a set top box system 10 is illustrated. The set top box 10 includes one or more web servers 14-1, 14-2, . . . , 14-n that are connected to the Internet 18. A gateway 20 connects a distributed communications system (DCS) 22 to the Internet 18. The gateway 20 can be a proxy server, a router, a fireway or any other suitable gateway. The web server 14 can be connected to the DCS 22. A media provider 24 is connected to the DCS 22. Alternately, the media provider 24 can be connected to the Internet 18. One or more set top boxes 26-1, 26-2, . . . , 26-n are connected to the DCS 22. The media provider 24 provides multimedia content via the DCS 22 to the set top boxes 26. A television (TV) display 30 is connected to each set top box 26.

Skilled artisans can appreciate that connections between the Internet 18, the web servers 14 and the gateway 20 and between the set top box 26, the media provider 24 and the DCS 22 can be any suitable transmission media such as a cable connection (coaxial cable or fiberoptic cable), a cable-based modem, a phone-based modem, a local area network (LAN), a wide area network (WAN), a satellite-based connection, a terrestrial-based connection, or any other suitable connection. IEEE 1394 wire may also be employed. Additionally, the set top box 26 can be integrated with electronics that are associated with the display 30 if desired. The display 30 can be a TV, a network TV display, or other suitable displays.

In use, the web servers 14 deliver web pages that are requested by the user of the set top box 26. The web server 14 includes an input/output (I/O) interface 72 that is connected to a processor in memory 78. The web server 14 is connected to the Internet 18 or the DCS 22. The memory 78 preferably includes read only memory (ROM), Random Access Memory (RAM) and/or external storage such as floppy drives, hard drives, optical drives, and other suitable storage media. The memory 78 includes an operating system/server module 84. The web server 14 is connected to the Internet 18 in any of the ways that were previously described. The web server 14 typically includes a display 102, a keyboard 104, a mouse 106, and other suitable I/O devices 108.

Referring now to FIG. 3, the set top box 22 is illustrated in further detail and includes an I/O interface 150, a processor 154, and memory 156. The set top box 26 is connected to the DCS 22. The memory 156 includes Random Access Memory (RAM) and Read Only Memory (ROM), and/or other electronic storage such as a hard drive, floppy drive, an optical storage device, or any other suitable electronic memory storage. When the set top box 26 is turned on, an operating system 160 is loaded into memory 156. A set top box browser 162 is also loaded into memory 156 when needed. A portion of the memory 156 is used for cache 164. Cache items include web pages or HTML documents that include HTML text plus images, audio, video, scripts, fonts such as MicroType® and TrueType® and scripts such as JavaScript® that are stored in the cache 164. Still other media types that will be developed in the future are contemplated. A cache manager 166 manages the cache 164.

The cache manager 166 is associated with one or more tables 168 that contain information for managing the cache 164 as will be described further below.

The set top box 26 is connected to the DCS 22 in any of the ways described above. The display 30 is connected to the I/O interface 150. The set top box 26 can include I/O devices 176 such as a keyboard 180, a remote 184, a joystick (not shown), a game pad (not shown), or any other suitable I/O devices.

Figure 4B:
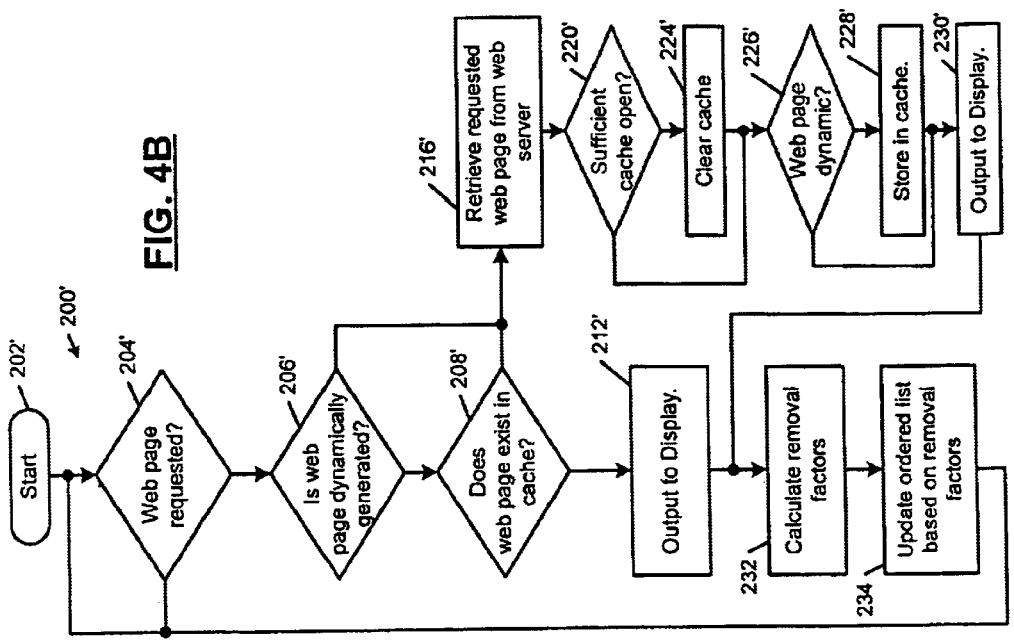
FIG. 4B illustrates the flowchart of FIG. 4A with additional steps for calculating removal factors and for updating an ordered list.
Figure 4A:
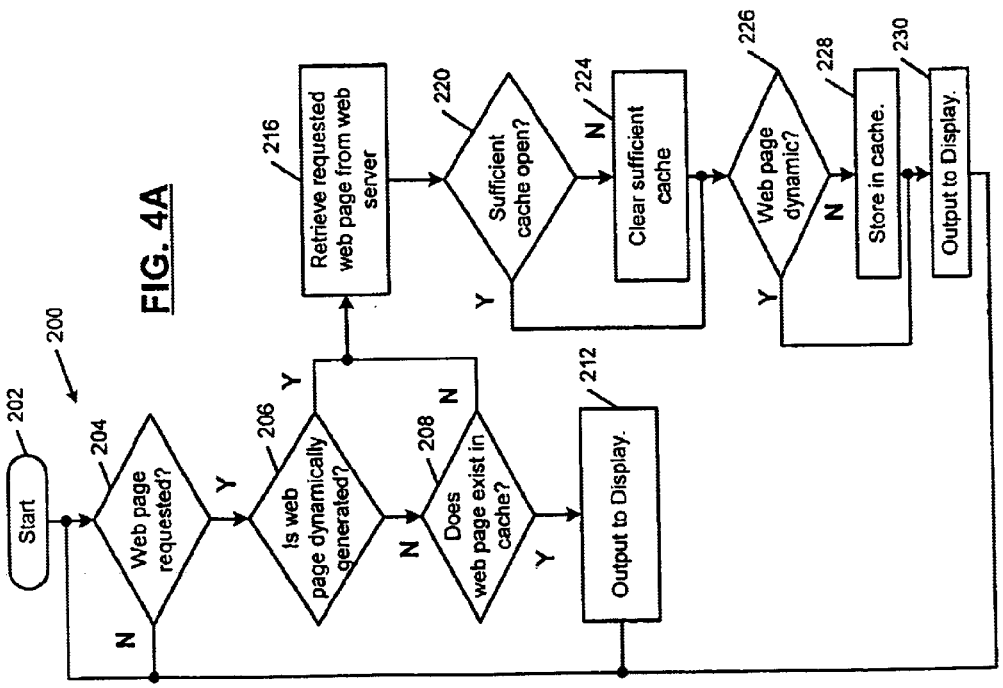
FIG. 4A is a flowchart illustrating steps for managing the cache of the set top box when web pages are requested by a user.

Referring now to FIG. 4A, a flowchart illustrating steps for managing the cache 164 using the cache manager 166 is illustrated and is generally designated 200. Control begins at step 202. Control continues with step 204 where control determines whether the user has requested a web page using a uniform resource locator (URL). If not, control loops back to step 204.

Otherwise control continues with step 206 where control determines whether the requested web page is dynamically generated. Examples of dynamically generated web pages include JavaScript® web pages having a ".jsp" extension and active server pages having a ".asp" extension. Skilled artisans will appreciate that the present invention has application to other dynamically generated web page formats that currently exist and/or that will be created in the future. If the web page is not dynamically generated, control continues with step 208 where control determines whether the web page requested by the user exists in the cache 164. If the web page exists in the cache 164, control continues with step 212. Control outputs the web page to the display 30 and continues with step 204.

If the web page is dynamically generated, control continues from step 206 to step 216. If the web page is not dynamically generated and the web page does not exist in cache, control continues from step 208 to step 216. In step 216, control retrieves the requested web page from the web server 14 using the URL.

Control continues with step 220 where control determines if sufficient cache is available to store the web page. If insufficient cache is available, control clears sufficient cache to store the web page in step 224. In step 226, control determines whether the web page is dynamically generated. If not, control stores the web page in the cache in step 228. Control continues with step 230 where control outputs the web page to the display 30. If the web page is dynamically generated, control continues from step 226 to step 230. Control continues from step 230 to step 204.

Referring now to FIG. 4B, a second flowchart illustrating steps for managing the cache 164 using the cache manager 166 is generally designated 200'. Reference numbers from FIG. 4A have been used with a prime (') to denote similar elements where appropriate. Control continues after step 212' and calculates removal factors at step 232. In step 234, control updates an ordered list based on the updated removal factors.

Removal factors are used to rank the cache items that are stored in the cache 164. Cache items with a higher removal factor take precedence over cache items with lower removal factors. The cache items are organized in the ordered list to increase the speed of the cache management process. Removal factors will be described further below in connection with FIGS. 7A, 7B, 8, and 9.

Referring now to FIG. 5A, a first flowchart illustrates steps performed by the cache manager 166 to clear sufficient cache (steps 224 and 224' in FIGS. 4A and 4B). Control begins with step 250. At step 252, control determines whether the web page size is greater than the unused cache.

If not, control stores the web page in cache and outputs the web page to the display 30 in step 256'. In step 260, control returns to step 202.

If the web page size exceeds the unused cache, control continues with step 264 where control identifies a web page with the lowest removal factor. At step 268, control deletes the web page with the lowest removal factor and returns to step 252. Control also preferably removes web pages that were preloaded when the deleted web page was initially loaded. Control loops through steps 252, 264 and 268 until the web page size is less than the unused cache. When the web page size is less than the unused cache, control continues with steps 256 and 260.

Referring now to FIG. 5B, a second flowchart illustrates steps performed by the cache manager 166 to clear sufficient cache (steps 224 and 224' in FIGS. 4A and 4B) to provide hystersis or breathing room. Control begins at step 280. Control continues with step 282 where control determines whether the web page size exceeds available system memory minus a breathing room threshold. If is does, control continues with step 318 where control removes web pages with the tag "useOnce" and removes expired web pages. The "useOnce" and expiration tags are set by the content developers of the web site and/or by the set top box 26.

Control continues with step 322 where control determines whether the web page exceeds the available system memory minus the breathing room threshold. The extra amount of memory that is cleared for breathing room reduces the number of times that the process of deleting the web pages in cache will be performed. If not, control continues with step 326 where control identifies the web page with the lowest removal factor. Control continues with step 330 where control deletes the web page with the lowest removal factor. Control also preferably identifies and deletes web pages that were preloaded when the deleted web page was initially loaded (if the related web page(s) are not used). Control loops through steps 322, 326 and 330 until the web page exceeds the available system memory minus the breathing room threshold.

If the web page size does not exceed the available system memory minus the breathing room threshold (as determined in steps 282 or 322), control continues with step 332. In step 332, control stores the web page in cache and displays the web page on the display 30. In step 336, control continues with step 202.

Figure 6:
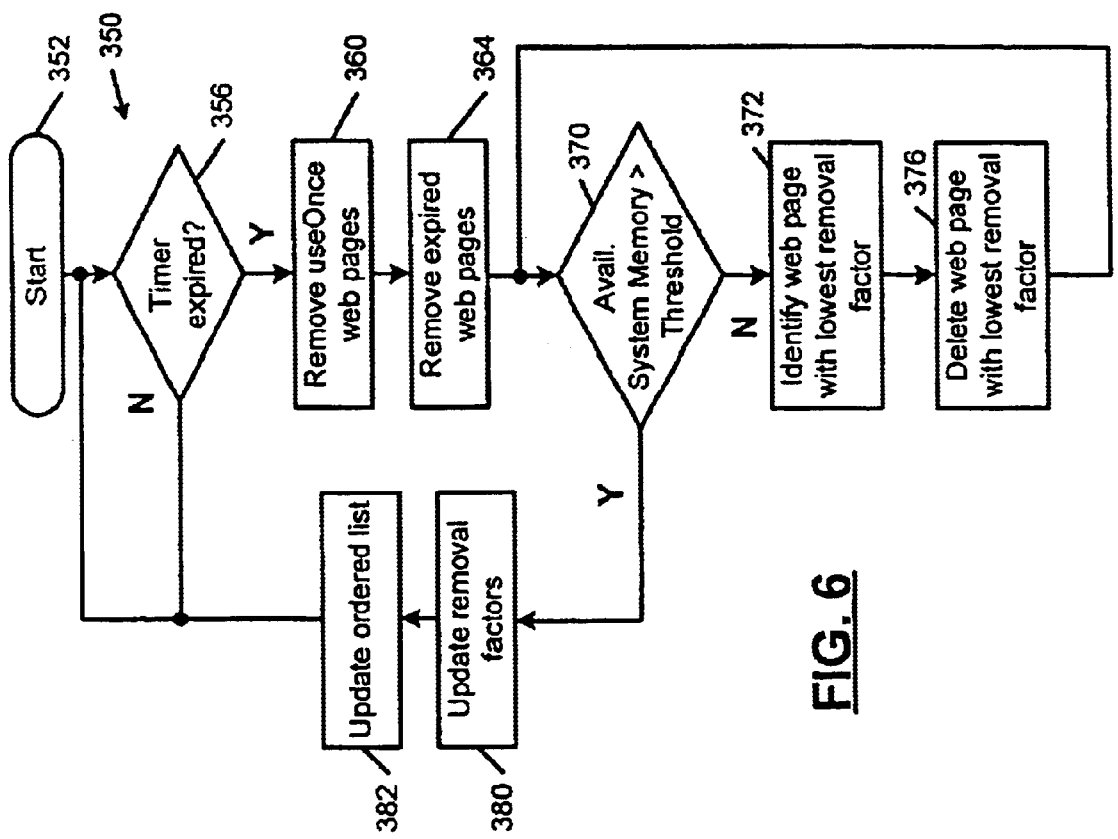
FIG. 6 is a flowchart illustrating steps for periodically maintaining the cache.

Referring now to FIG. 6, an alternate method of managing the cache is illustrated at 350. Housekeeping of the cache 164 is performed on a periodic basis. Control begins with step 352. Control continues with step 356 where control determines whether a timer has expired. If not, control loops back to step 356. Otherwise, control continues with step 360 where control removes web pages with a tag "useOnce". Control continues with step 364 where control removes web pages that have expired.

Control continues with step 370 where control determines whether the available system memory is greater than the breathing room threshold. If not, control continues with step 372 where control identifies a web page with the lowest removal factor. At step 376, control deletes the web page with the lowest removal factor. Control also preferably identifies and deletes web pages that were preloaded when the deleted web page was initially loaded (if the related web page(s) were not used). Control loops through steps 370, 372 and 376 until the available system memory exceeds the breathing room threshold. Control may also check whether available system memory increases after looping through steps 370, 372 and 376 to prevent endless looping when system memory is taken by other set top functions and no web pages are stored in cache. Similar checks may be performed in FIGS. 4A, 4B, 5A and 5B.

When the available system memory exceeds the breathing room threshold, control continues with step 380. In step 380, control updates the removal factors. In step 382, control updates the ordered list of removal factors and continues with step 356.

Referring now to FIG. 7A, a table 400 containing removal factors is illustrated. The table 400 includes a plurality of columns 402 and a plurality of rows 404. The table 400 includes a key column 406 that contains a key that identifies a web page. Additional columns include a "LastUsed" column that identifies the last time that the web page was used. A "TimesUsed" column identifies how many times the cache item has been used since being stored in the cache 164. A "Size" column 412 identifies the size of the cache item. A "Type" column indicates the media type of the cache item such as video, text, audio, etc. A "C/D" column 418 indicates whether the cache item is compressed ("C") or decompressed ("D"). A "Priority" column 420 indicates a developer-assigned priority for the cache item. The developer-assigned priority can be set at "0" that is the default (or no priority specified) or "1" to "9". "1" is the lowest priority and "9" is the highest priority. A "Removal Factor" column 424 is a calculated factor that will be described further below. Preferably, the table is sorted by the "Removal Factor" column in a lowest-to-highest or in a highest-to-lowest order depending upon how the table is accessed.

Referring now to FIG. 7B, a second table 430 is illustrated. The table 430 contains rows 432 and columns 434 that define the weightings that will be given to the columns of the table 400 in calculating the removal factor for a particular cache item. The columns include a "Type" key column that corresponds to the "Type" column 414 in FIG. 7A. The table 430 includes factor weightings 440, 442, 444, 446, 448 and 450 that are associated with the columns of the table 400 in FIG. 7A. For example, the factor weighting 440 is associated with the "LastUsed" column 408. The factor weighting 442 is associated with the "TimesUsed" column 410. The factor weighting 444 is associated with the "Size" column 412. The factor weighting 446 is associated with the "Type" column 414. The factor weighting 448 is associated with the "C/D" column 418. The factor weighting 450 is associated with the "Priority" column 420. The particular row from the table 430 is selected based on the data in the "Type" column 414 for the particular web page.

Referring now to FIG. 7C, table 454 contains values that are substituted for the "Type" column values when calculating the removal factors. Referring now to FIG. 7D, table 458 contains values that are substituted for the "C/D" column values when calculating the removal factors. Referring now to FIG. 7E, table 462 contains values that are substituted for the "TimesUsed" column values when calculating the removal factors. The "LastUsed" column is preferably is a difference between either a fixed date or the oldest date in the table. The difference is preferably normalized to create a factor.

Figure 8:
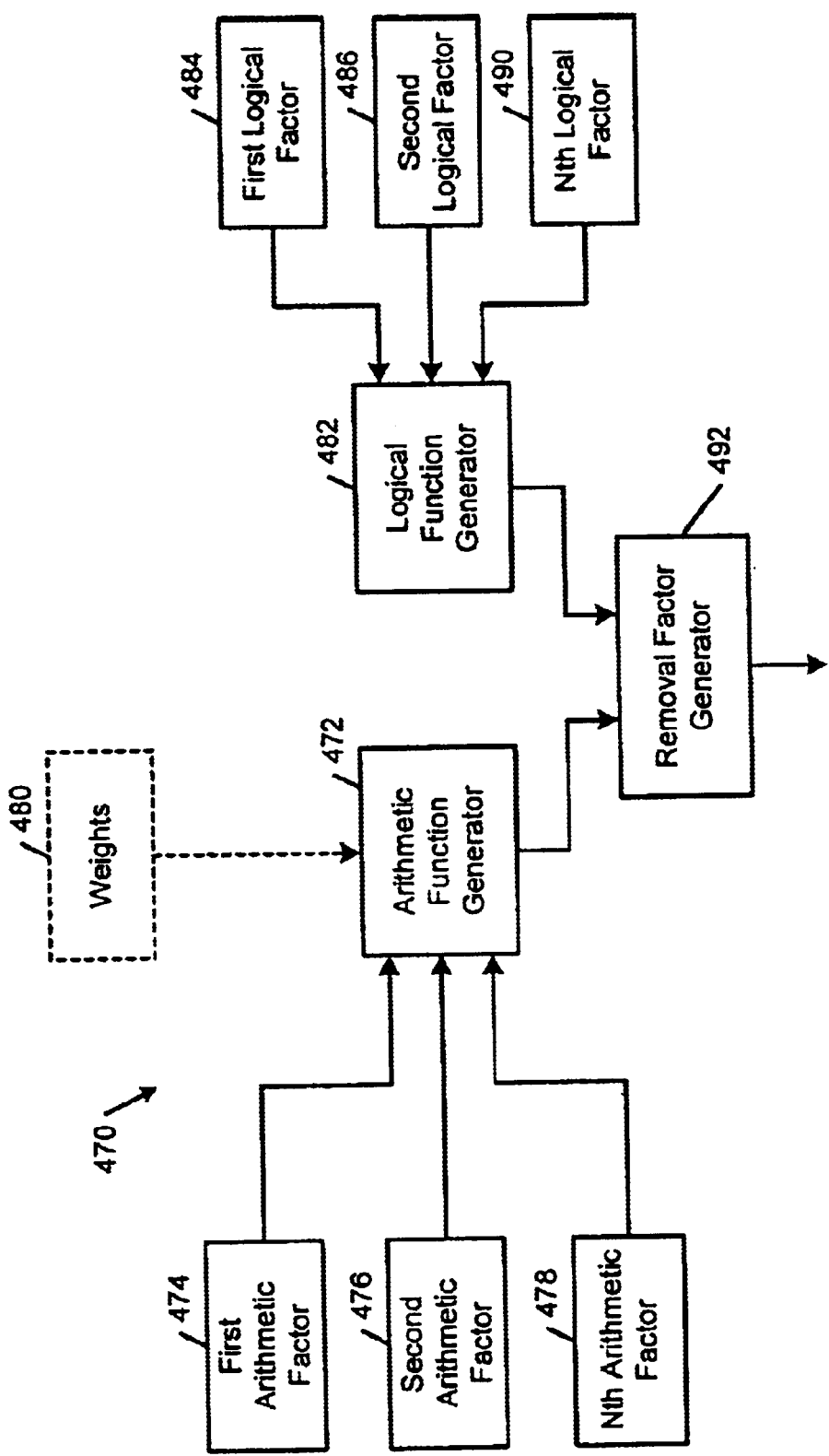
FIG. 8 is a data flow view illustrating the calculation of removal factors.

Referring now to FIG. 8, the calculation of the removal factors is illustrated. An arithmetic function generator 472 generates an output based on one or more inputs (F(input1, input2, . . . , input n)). A first arithmetic factor 474, a second arithmetic factor 476 and an $n^{th}$ arithmetic factor 478 are input to the arithmetic function generator 472. One or more weights may be stored in a table and input to the arithmetic function generator 472.

A logical function generator 482 includes one or more inputs. A first logical factor 484, a second logical factor 486 and an $n^{th}$ logical factor 490 are input to the logical function generator 482. The logical function generator 482 generates values from non-numerical data such as "Type", "C/D", etc. The logical function generator 482 provides value outputs using lookup tables and/or logical outputs such as enable and disable outputs. For example, if the set top box includes hardwired or hardware accelerated circuits for decompressing MPEG images, the decompressed images can be deleted without a significant loss of performance. If the HTML document is a decompressed MPEG image, the logical function generator can output a disable signal to set the removal factor equal to zero—effectively eliminating the decompressed MPEG image from the cache. The removal factor generator 472 outputs a removal factor based on arithmetic and/or logical functions. The removal factor is stored in the table 402. The removal factor calculations are repeated for each cache item.

Referring now to FIG. 9, a data flow view illustrating the calculations that are performed by the cache manager 166 to calculate the removal factors according to a preferred embodiment of the invention is shown at 500. The cache manager 166 selects a first cache item (such as "www.add . . . ") in the table 400. The cache manager 166 selects a first factor (such as the priority of the cache item—in this example the priority is "8") from the table 400 and stores the first factor at 502. The cache manager 166 selects a first factor weight from the table 430 by using the data value of the "Type" column ("A") for the first cache item as a lookup (in this example the first factor weight would be "10" that is found in column 450). The first factor weight is temporarily stored at 504.

The cache manager 166 selects a second factor (such as the "Type" of the cache item—in this example the type is "A") from the table 400. The cache manager 166 selects the value ("20") from the table 454 and temporarily stores the second factor at 504. The cache manager 166 selects a second factor weight from the table 430 by using the data value of the "Type" column ("A") for the first cache item as a lookup. In this example, the second factor weight would be "20" that is found in column 446. The cache manager temporarily stores the second factor weight at 512. The cache manager 166 selects 0 to n additional factors and factor weights in a similar manner as indicated at 516 and 520.

The cache manager 166 multiplies the first factor by the first factor weight at 522 to generate a first product 524. The cache manager 166 multiplies the second factor by the second factor weight at 526 to generate a second product 528. The cache manager 166 multiplies the $n^{th}$ factor by the $n^{th}$ factor weight at 530 to generate an $n^{th}$ product 532. Normalization or other conventional processing can be performed on the factors, the factor weights, the sums and/or the products if desired. The products 524, 528 and 532 are added at 536 to generate a removal factor 540 for the cache item. The cache manager 166 repeats the steps for other cache items. Subsequently the cache manager 166 updates the ordering of the table 400 to reflect the changes to the removal factors. A lowest-to-highest or highest-to-lowest ordering can be used depending on how the table 400 is accessed.

Skilled artisans can appreciate that still other methods of calculating the removal factors are contemplated. The cache manager 166 can calculate the removal factors based on a function F that depends on one or more of the usage and/or data type factors for each cache item.

As can be appreciated from the foregoing, the access times that are required to retrieve a requested web page in a set top box environment is significantly reduced by the cache manager according to the present invention. Furthermore, management of the cache is optimized through the use of an optimized heuristic that takes into account usage, developer-designated priority, data type, compression status, size and/or other pertinent factors.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, specification and the following claims.

What is claimed is:

1. A cache management system for a set top box that improves the loading speed of hypertext markup language (HTML) documents that are provided by web servers throughout a distributed communications system, comprising:

a set top box including a processor and memory, wherein said memory includes cache;

a plurality of HTML documents that are stored in said cache; and a cache manager that manages said cache and that calculates a removal factor for each of said HTML documents, wherein said removal factor is at least partially based on whether said at least one of said HTML documents is compressed or decompressed, wherein said cache manager removes at least one of said HTML documents based on its removal factor until sufficient room is available for an additional HTML document when a user requests access to said additional HTML document and insufficient cache is available to store said additional HTML document in said cache.

2. The cache management system of claim 1 wherein said removal factor is calculated using at least one of a logical and an arithmetic function.

3. The cache management system of claim 1 wherein said removal factor is at least partially based on a number of times that said at least one of said HTML documents was used while it was stored in cache.

4. The cache management system of claim 1 wherein said removal factor is at least partially based on how long since said at least one of said HTML documents was last used.

5.. The cache management system of claim 1 wherein said removal factor is at least partially based on a size of said at least one of said HTML documents.

6. The cache management system of claim 1 wherein said removal factor is at least partially based on a file type of said at least one of said HTML documents.

7. The cache management system of claim 1 wherein said removal factor is at least partially based on a content developer-designated priority for said at least one of said HTML documents.

8. The cache management system of claim 1 wherein said removal factor is calculated by multiplying a first factor by a first weight to generated a first product, a second factor by a second weight to generate a second product, and an $n^{th}$ factor by an $n^{th}$ weight to generate an $n^{th}$ product.

9. The cache management system of claim 8 wherein said first, second and nth products are summed.

10. The cache management system of claim 9 wherein said first, second and $n^{th}$ products are normalized prior to being summed.

11. The cache management system of claim 9 wherein said first factor is normalized prior to being multiplied by said first weight.

12. The cache management system of claim 1 wherein said cache manager employs a lookup table when calculating said removal factors.

13. The cache management system of claim 1 further comprising:

a table that is accessible by said cache manager, that is stored in memory of said set top box and that arranges said HTML documents in an ordered list based on said removal factors.

14. The cache management system of claim 1, wherein said cache manager employs a threshold when removing said HTML documents from said cache to create room for said additional HTML document when said user requests access to said additional HTML document and insufficient cache is available to store said additional HTML document.

15. The cache management system of claim 14, wherein said cache manager continues to remove said HTML documents until a predetermined extra amount of said cache is available.

16. The cache management system of claim 1 wherein said cache manager continues to remove said HTML documents until available system memory is above a threshold.

17. A method for managing a cache in a set top box to improve the loading speed of hypertext markup language (HTML) documents that are provided by web servers through a distributed communications system, comprising the steps of:

storing a plurality of HTML documents in said cache;

calculating a removal factor for each of said HTML documents, wherein said removal factor is at least partially based on whether said at least one of said HTML documents is compressed or decompressed; and removing at least one of said HTML documents based on its removal factor until sufficient room is available for an additional HTML document when a user requests access to said additional HTML document and insufficient cache is available to store said additional HTML document.

18. The method of claim 17 wherein said removal factor is calculated using at least one of an arithmetic function and a logical function.

19. The method of claim 17 wherein said removal factor is at least partially based on a number of times that said at least one of said HTML documents was used.

20. The method of claim 17 wherein said removal factor is at least partially based on how long since said at least one of said HTML documents was last used.

21. The method of claim 17 wherein said removal factor is at least partially based on a size of said at least one of said HTML documents.

22. The method of claim 17 wherein said removal factor is at least partially based on a file type of said at least one of said HTML documents.

23. The method of claim 17 wherein said removal factor is at least partially based on a content developer-designated priority for said at least one of said HTML documents.

24. The method of claim 17 wherein said step of calculating said removal factors includes the steps of:

multiplying a first factor by a first weight to generated a first product;

multiplying a second factor by a second weight to generate a second product; and multiplying an $n^{th}$ factor by an $n^{th}$ weight to generate an $n^{th}$ product.

25. The method of claim 24 wherein said step of calculating said removal factors includes the step of:

summing said first, second and $n^{th}$ products.

26. The method of claim 20 wherein said step of calculating said removal factors includes the step of:

normalizing said first, second and third products prior to said summing step.

27. The method of claim 24 wherein said first factor is normalized prior to being multiplied by said first weight.

28. The method of claim 17 wherein said step of calculating includes the step of:

using a lookup table.

29. The method of claim 17, further comprising the steps of:

employing a threshold when removing said HTML documents from said cache to create room for said additional HTML document when said user requests access to said additional HTML document and insufficient cache is available to store said additional HTML document.

30. The method of claim 29, further comprising the step of:

continuing to remove said HTML documents until a predetermined extra amount of said cache is available.

31. The method of claim 17 further comprising the step of: removing said HTML documents until available system memory is above a threshold.

32. The method of claim 17 further comprising the step of: removing preloaded HTML documents that are related to said at least one of said HTML documents that is removed based on its removal factor.

* * * * *

UNITED STATES PATENT AND TRADEMARK OFFICE
CERTIFICATE OF CORRECTION

PATENT NO. : 6,681,298 B1
DATED : January 20, 2004
INVENTOR(S) : Tso et al.

It is certified that error appears in the above-identified patent and that said Letters Patent is hereby corrected as shown below:

Column 5,
Line 20, delete "is" and insert therefore -- it --.

Column 8,
Line 65, delete "generated" and insert therefore -- generate --.

Column 10,
Line 14, delete "generated" and insert therefore -- generate --.

Signed and Sealed this

Ninth Day of November, 2004

JON W. DUDAS
*Director of the United States Patent and Trademark Office*